United States Patent

[11] 3,586,833

[72] Inventor Robert H. Schafer
Farmington, Mich.
[21] Appl. No. 857,356
[22] Filed Sept. 12, 1969
[45] Patented June 22, 1971
[73] Assignee Burroughs Corporation
Detroit, Mich.

[54] CARD READER FORMAT CONTROL SYSTEM
3 Claims, 21 Drawing Figs.

[52] U.S. Cl. .......... 235/61.11, 340/172.5
[51] Int. Cl. .......... G06k 7/016, G06f 9/00
[50] Field of Search .......... 235/61.6, 61.7, 61.1, 61.9, 61.11, 61.111, 61.115; 340/172.5

[56] References Cited
UNITED STATES PATENTS
3,522,416 8/1970 Soule, Jr. et al. .......... 235/61.6 R

*Primary Examiner*—Daryl W. Cook
*Attorneys*—Kenneth L. Miller, Wallace P. Lamb, Paul W. Fish and Edwin W. Vren

ABSTRACT: A format control system for card readers having a multiple stage shift register for storing formatting information. Each stage of the shift register corresponds to a column of information on a data punched card. A special combination of information markings in the first column of a format card permits a new format information to be read by the card reader and stored in the shift register. As punched cards are being read, a strobe member synchronizes the corresponding stage of the format shift register with the card column being read to control the data flow from the card reader to a central processor.

INVENTOR.
ROBERT H. SCHAFER
BY Russell C. Wells
ATTORNEY

CARD READER FORMAT CONTROL SYSTEM

BACKGROUND OF INVENTION

Prior art devices for format control for punched card reader, paper tape readers or other similar apparatus have included, by way of example, special format tapes, special wheels, discs or gearlike devices. In each of these devices, it is necessary to change the particular format device whenever the format was altered. A mechanical aptitude on the part of a business machine or computer operator is required not only to change the format device but also to synchronize the format control device with the media to be read.

SUMMARY OF INVENTION

It is a principal object of this invention to provide a format control system wherein the format is easily changed and synchronized with the information media.

To accomplish this and other objects, the format control system comprises a single reading station for reading both format information and data information from like media, a plurality of storage members equal to or greater in number than the number of data columns for storing the format information regarding each data column and a strobing member which is operatively connected to the reading station and the storage members to synchronize the column of information being read at the reading station with the format information in the particular storage member representing that column. Logical gating means is provided to control the information being read at the reading station and to selectively gate only format information into each storage member.

DETAILED DESCRIPTION

Figure 1:
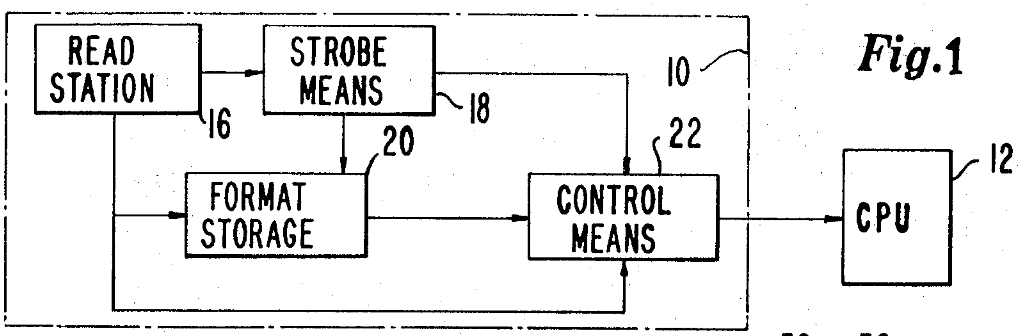
FIG. 1 is a block diagram of a data processing system incorporating the card reading format control system.

Referring to the figures and characters of reference there is shown in block diagrammatic form the relationship between a card reader 10 having the preferred embodiment of the format control system and the central processing unit 12, hereinafter referred to as CPU, for processing the data information received from the card reader 10. The CPU 12 may be any type of data processing unit such as a processor for a large scale computer or a smaller direct accounting computer system such as found in small businesses or in the branch offices of large financial institutions.

The card reader 10 comprises a card transport system 14 for singly transporting punched cards through a reading station 16, a means 18 for synchronizing or strobing each column of the punched card as it is moved through the reading station, a format storage member 20 for storing the format information regarding each column of the punched card and control means 22 to correlate the strobing means with the comparison between the information read from the punched card and format information in the format storage member 20. The resulting electronic signals from the control means 22 are then processed by the CPU 12.

Figure 2:
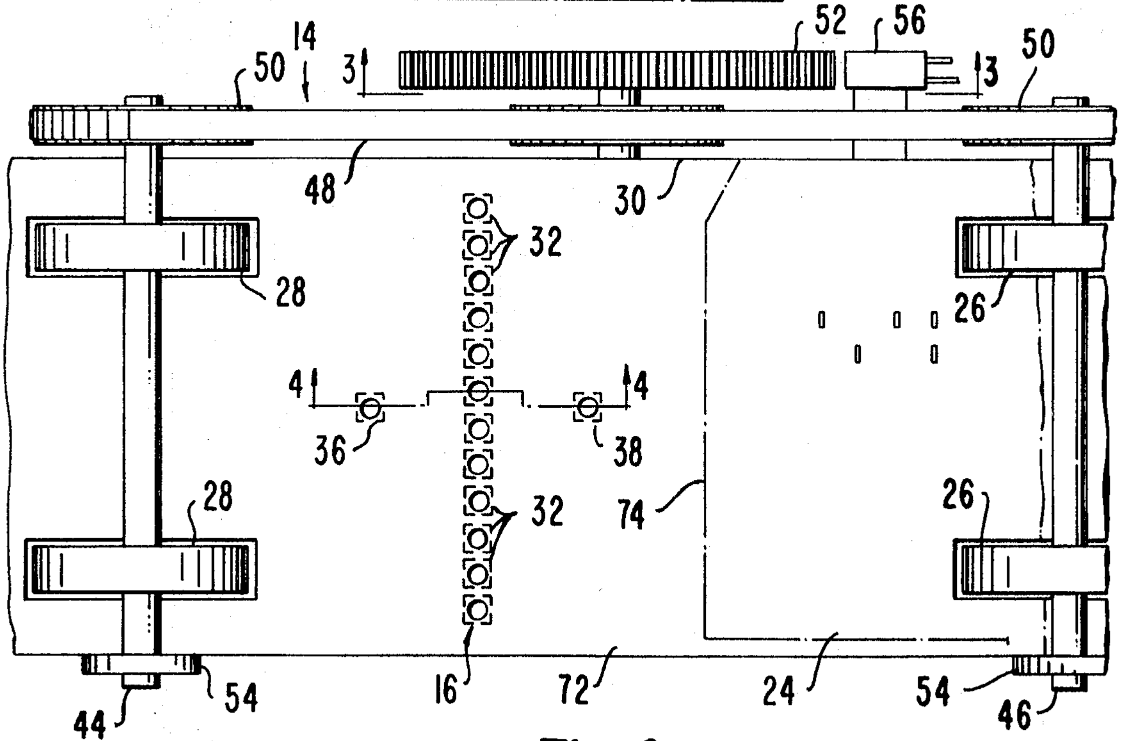
FIG. 2 is a plan view of the card reader reading station.

As illustrated in FIG. 2, a single punched card 24 is driven by a first set of drive rollers 26 through a reading station 16 to a second set of drive rollers 28. The punched cards to be used may be stacked in a storage hopper, which is to the right of FIG. 2 but is not shown, and are singly removed from the bottom of the stack. Each punched card 24 is guided along one edge 30 to register the proper location of the data rows on the card with each of the corresponding reading means in the read station. In the preferred embodiment, the punched card is driven along its edge nearest the uppermost row or row 12 through the read station.

The read station 16 comprises a plurality of data solar cells 32 and solar cell illuminators or lamps 34 arranged in a straight line orthogonal to the direction of card movement and when referenced to a punched card 24 comprises a column of information. Positioned on either side of the column of data solar cells 32 and in the preferred embodiment between data rows 3 and 4, is a single solar cell 36 and 38 and lamp 40, 42. The solar cell 38 to the right of the column or upstream from the data cells 32 when related to document movement identified as the trailing edge solar cell, is spaced from the data solar cells 32 a distance which is less than the spacing between three columns but greater than the spacing between two columns. Thus, if column one of a punched card 24 is aligned with data solar cells 32 column three is to the left of the trailing edge solar cell 38 and column four is to the right.

A second solar cell 36 hereinafter referred to as the leading edge solar cell, and a lamp 40 is likewise spaced downstream or to the left of the data solar cells 32 a similar distance. When the leading edge of a punched card 24 covers this solar cell 36, column one of the punched card is in position overlying the data solar cells 32. Thus a function of this cell is to register the position of the first column of the card.

As the punched card 24 passes through the reading station 16 it is driven by a second set of drive rollers 28 to a receiving hopper, not shown, to the left of the leading edge solar cell 36. In this hopper, the punched cards are stacked so that each successive card overlies the previous card. In this manner, the cards when removed from the receiving hopper are in their proper sequence.

In order to provide constant and steady movement of the card, both of the drive roller shafts 44 and 46 are mechanically coupled together by means of a timing belt 48 riding on a pulley 50 attached at one end of each shaft. The opposite end of each shaft is journaled in a bracket 54 to maintain the parallel relationship between each drive shaft 44 or 46. The timing belt 48 interconnects the drive roller pulleys 50 to a motor, not shown, and to a timing disc 52 which is a part of the strobing system 18 of the reader. In the preferred embodiment, rotational speed of the drive roller shafts 44 and 46 and the timing disc 52 are equal but such is not necessarily a requirement for the format control system.

Figure 3:
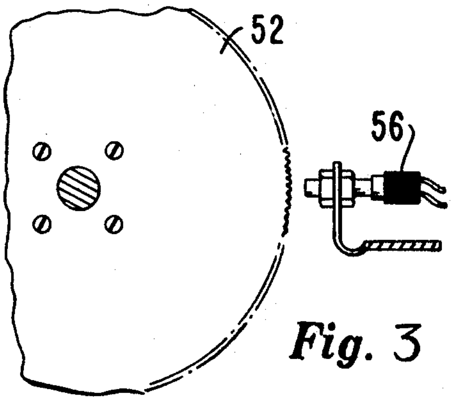
FIG. 3 is a view with parts broken away taken along line 3—3 in FIG. 2.
Figure 4:
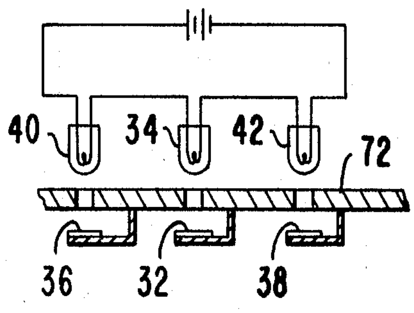
FIG. 4 is a fragmentary sectional view taken along line 4—4 of FIG. 2.

The timing disc 52, which is shown in FIG. 3, is basically a fine pitch gear wheel. Positioned adjacent to the periphery of the timing disc is a magnetic transducer 56 which generates an electrical signal in response to each tooth. In the preferred embodiment there are 288 teeth around the periphery of the disc 52 and the rotational speed of the disc at the pitch line is of such a magnitude that there are eight teeth between each column on the moving punched card. The large number of teeth on the timing disc 52 permits the disc to be a constantly rotating disc which need not be controlled by a clutch mechanism.

Figure 5:
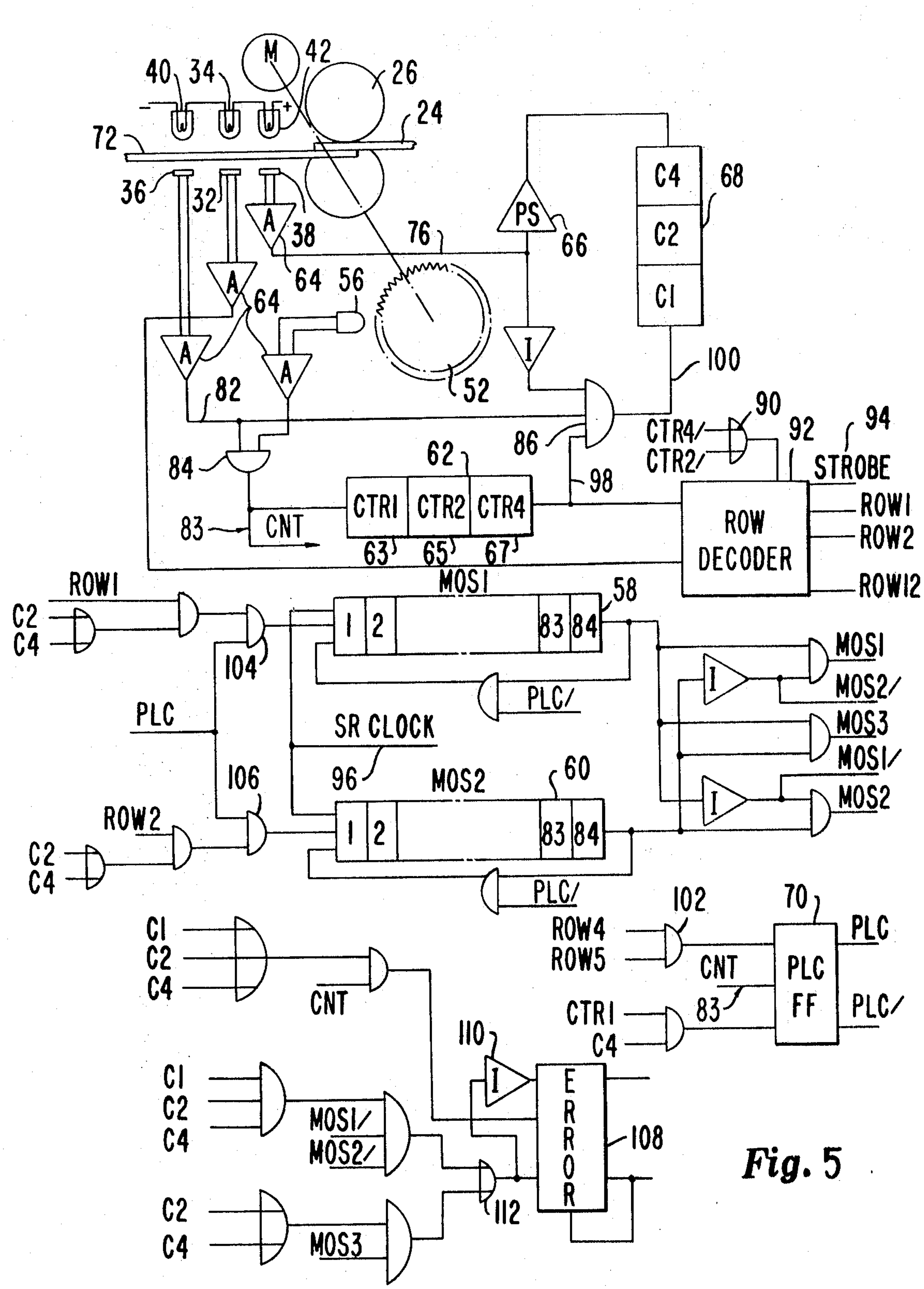
FIG. 5 is a schematic of the format control system.

The format storage member 20 is schematically illustrated in FIG. 5 and in the preferred embodiment comprises a pair of 84 stage shift registers 58 and 60. Each of the first 80 stages of the shift register correspond to the 80 columns of a standard punched card as is used in data processing. The last four stages contain selected information for accurately insuring the synchronization between each column on the punched card 24 and the format information in each stage. With the use of two shift registers 58 and 60, four different formats are possible for each column of information.

The control means 22 performs the functions of determining the character of the information being read in the read station 16 and directing the information flow from the read station to either the format storage member 20 or the CPU 12 under the synchronizing control of the strobing means 18. If the information being read is format information, the control means 22 directs the flow of data from the read station 16 to the format storage member 20 and not to the CPU. However, if information being read is data information to be processed by the CPU 12, the control means 22 synchronizes the flow of data with each stage of the format storage member 20 and the timing disc 18 to supply the CPU with the information to be processed.

Synchronization between information read by the data cells 32 and the identity of the particular card column is achieved through the combination of the moving punched card 24, the leading edge cell 36, the timing disc 52 and an electronic counter 62 as will hereinafter be explained.

The electronic logic which is used to provide the synchronization between the data format and the particular punched card being processed is shown by the schematic of FIG. 5. The logic is used in basic AND and OR logic notation wherein a true signal is more positive than a false signal. Also used in the schematic are several amplifiers 64 for increasing the signal level of several signals such as solar cell signals and the magnetic transducer signal. A pulse standardizer 66, labeled PS, is basically a capacitive-coupled amplifier which provides a pulse output of a desired time width in response to a voltage level change at its input. In the schematic, the pulse standardizer 66 is a positive triggered device, that is a voltage change from a low voltage level to a more positive voltage level will generate a pulse output. The counters 62 and 68 are basic ripple counters wherein each stage is a bistable multivibrator. The two format storage devices or registers which are labeled MOS1 58 and MOS2 60 respectively, are each 84 stage shift registers arranged in a recirculating mode of operation thereby having a single input position and a single output position. In the preferred embodiment these shift registers are metallic-oxide semiconductors or MOS devices. The timing diagrams or voltage waveforms of FIG. 6 et seq will assist in the understanding of the operation of the format control system.

METHOD OF OPERATION

The format control system comprises at least one dynamic recirculating shift register for storing information to be used for controlling the flow of data from a punched card 24 to a CPU 12. In the preferred embodiment which is schematically illustrated in FIG. 5, comprises two 84 stage shift registers 58 and 60. The operation of the format control system can best be described by reference to the FIG. 5 et seq wherein FIGS. 6 et seq are voltage waveforms showing the timed relationship between the logic elements. As indicated, the timing signals show in detail column one and column 79 through column 84. It is to be understood, for the purpose of illustration, that column one through and including column 80 represent the columns on a punched card. Therefore, any discussion relating to column one, 79 or 80 is representative of any intervening column. Columns 81 through and including column 84 are used to determine whether or not the information in the format registers 58 and 60 is in synchronization with the movement of the punched card 24 through the reading station 16. If the punched card had fewer columns, then the format control system would require a smaller number of stages in the shift register.

Figures 6, 7, 8, 9, 10, 11, 12, 13, 14, 15, 16, 17, 18, 19, 20, 21:
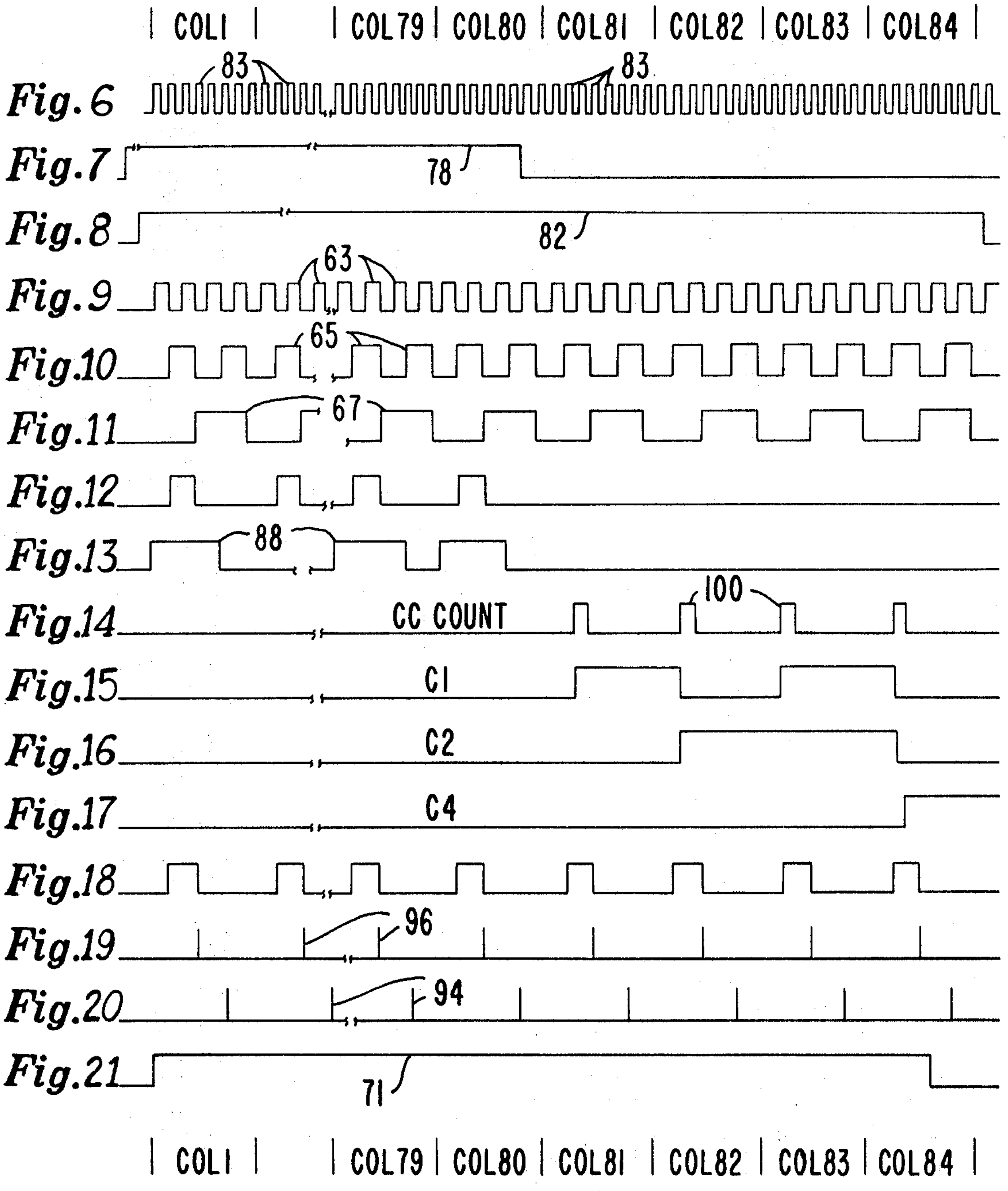
FIGS. 6—21 are timing diagrams of the format control system.

Initially, the format for a group of punched cards which are to be read in the card reader is punched on a special program card in a manner identical to the punching of data information on the cards. In the present system, format is encoded in rows 1 and 2 and has the following control function:

Row 1—Start Alpha
Row 2—End of Alpha or End of Word
Row 1 and Row 213 Ignore
No encoding—Information To Be Processed The information on the program card is loaded into the two shift registers 58 and 60 under control of the timing disc 52 and the program load control member 70 or flip-flop hereinafter sometimes referred to as PLC. The information in row 1 is loaded into MOS1 and the information in row 2 is loaded into MOS2. The equations defining the program load flip-flop are:

PLC = Row 4 · Row 5
PLC/ = CTR1 · C4 and the waveshape 71 is shown in FIG. 21. A special control code, such as a card having a punch in both row 4 and row 5 in column one, is used to indicate that the information contained on the punched card is format control information and should be loaded into the format registers 58 and 60. During the time that the program load control flip-flop 70 is set, the information from punched cards being processed is electronically prevented from being transferred to the CPU 12. The combination of row 4 and 5 is basically an invalid card code and therefore would not normally appear in a data column. At the end of loading of the checking information into the format registers 58 and 60, the program load flip-flop 70 is reset thereby preventing any data information from subsequent punched cards from being received into the format registers.

A punched card 24 is driven under control of the first set of drive rollers 26 along the card feed table 72 to the trailing edge cell 38 position. As the leading edge 74 of the punched card 24 covers the cell 38, the output voltage of solar cell 38 is reduced but the output 76 of the amplifier 64, which is an inverting amplifier is increased, as shown by the waveshape 78 in FIG. 7. The output 76 of the amplifier thereinafter referred to as TE, is supplied to the pulse standardizer 66 which generates a timing pulse to reset the column counter 68 to zero. The column counter 68 comprises three flip-flops having their true outputs labeled C1, C2, and C4. As will be shown, this counter 68 counts only for the check columns which are the four columns after the last valid column on the punched card 24.

When the leading edge 74 of the punched card 24 covers the leading cell 36 the voltage output 80 of its associated inverting amplifier 64 goes true as indicated by the waveshape 82 in FIG. 8 hereinafter referred to as LE. This signal 80 conditions one input of an AND gate 84 controlling the disc counter 62 comprising CTR1, CTR2 and CTR4 flip-flops and their respective waveshapes 63, 65 and 67 and also conditions one input of an AND gate 86 controlling the column counter 68. The disc counter 62 functions to count the eight teeth between the center of each adjacent column on the punched card 24. As previously indicated, when the leading edge 74 of the punched card 24 passes over the leading edge cell 36, column one is aligned with the data cells 32. As shown in FIG. 13, the data output 88 from the plurality of amplifiers 64 electrically connected to the data cells 32 appears during the disc counter 62 count from one through five which is schematically illustrated by the control OR gate 90 operatively connected to the row decoder 92. The several outputs from the row decoder 92 comprise a signal representative of each row on a punched card 24 and also a signal labeled STROBE 94 which is generated by the following equation and shown in FIG. 20:

STROBE = (CTR1 · CTR2 · CTR4) PLC/

The format registers 58 and 60 are clocked by a signal generated from the disc counter 62 depending upon whether or not the program load control flip-flop 70 is set. If the reader is reading data information whereby the program load control flip-flop 70 is reset, the STROBE signals shifts the format register but if the punched card is bearing format information, the program load control flip-flop 70 is set, then the shift register clocking signal 96 is as shown in FIG. 19 and the complete clocking signal is defined by the following equation:

SR Clock = STROBE+1 4· 2

The disc counter 62 generates another control signal 98 for counting the column counter which is defined by the following equation:

CC Clock=CTR1· CTR2· CTR4/

The signal 100 used to count is completely defined by the following equation and is shown in FIG. 14:

CC Count = the · CC Clock · LE

As previously indicated, the format control card 24 has been moved so that the leading edge 74 has passed over the leading edge solar cell 36 and therefore column one is aligned with the data cells 32. The magnetic transducer 56 output is amplified and supplied to the second input to the AND gate 84 to count the disc counter 62. FIG. 6 shows the pulse waveforms 83 which appear at the output of the AND gate 84 and will be referred to as CNT. In the first column there are at least two rows having information; namely, row 4 and 5 and also rows 1 and 2 may also be selectively punched with format information.

The information from the row decoder 92 relating to row 4 and 5 is supplied to another AND gate 102 which is electrically connected to the set input of program load flip-flop 70 as previously stated. On the second CNT pulse the flip-flop 70 is set and its output conditions one input on each of two AND gates 104 and 106 controlling the loading of the format registers MOS1 58 and MOS2 60. The second input on each AND gate 104 and 106 is a signal comprising the logical equation:

for MOS1=CB2+C4+Row 1 for MOS2=CB2+C4+Row 2

Since the format register is not shifted until a count of four is present at the control input of the format registers as shown in FIG. 19, format control information may be placed into the first stage or column one of the format registers 58 and 60 from the format control card 24.

As the format control card 24 is moved over the data cells 32, the information from row 1 and row 2 is individually placed in MOS1 58 and MOS2 60 format registers respectively. On an overall system approach, the row decoder can be inhibited from transferring information to the CPU 12, during format loading thereby avoiding the possibility of format control data from entering into the computation of the CPU.

When column 80 is aligned with the data cells 32, the trailing edge cell 38 is about to be uncovered. As shown in the timing diagrams, FIG. 7, this event occurs at a disc count of approximately CTR2 and CTR4. The voltage output of the trailing edge solar cell is increased and the signal TE 78, from the amplifier decreases.

As previously indicated, the distance between the leading edge cell 36 and the trailing edge cell 38 is somewhat greater than the distance between four card columns. Therefore, until the leading edge cell 36 is uncovered, the check digits or synchronizing digits are loaded into columns 81 through 84 of the format shift registers 58 and 60. As previously indicated, the counting pulse 100 for the column counter 68 is illustrated in FIG. 14 and is basically equivalent in time to a disc count of three.

During the CC Count signal, the first stage of the column counter 68 is counted thereby producing a C1 signal. During the next SR clock signal, the inputs to the format registers 58 and 60 are all false except for PLC and a "zero" is loaded into each format register in the 81st stage. However, during the next three SR clock signals either C2 is true or C4 is true thereby loading a "one" into stages 82, 83 and 84 of each format register. At a disc counter count of five and during C4, the Program Load Control flip-flop 70, PLC, is reset thereby preventing any further information from entering into the format registers 58 and 60.

At this point in time, the contents of the format registers are as follows:

Stages 1—80—format control information

Stage 81—"0" signal

Stages 82—84—"1" signal.

As will hereinafter be shown, the information in stages 81—84 will be used to recheck the synchronization between the data information bearing card and the format control registers.

The overall system as shown in FIG. 1, is typically controlled to immediately feed a second punched card following a program format control card. Since a format control card is identified by a punch in row 4 and row 5 of column one, the character of the punched card is quickly determined by the card reader system.

The information as read from a data information card is read in a manner exactly as explained previously for the format control card with the exception of the PLC flip-flop 70 remaining reset thereby preventing the format register from receiving new information. Also the SR clock signal as shown in FIG. 20 occurs after the data 88 is removed from the row decoder 92.

At the end of reading card column 80, the trailing edge cell 38 is uncovered and the format register is checked to determine whether or not all 80 columns of the punched card have been synchronously read with the format registers 58 and 60. The checking circuit, as illustrated in FIG. 5, comprises a plurality of AND and OR logic gating controlling an error control member 108 or flip-flop.

If the card and the format registers 58 and 60 are in synchronism, stage 81 of format register when compared with C1 will contain a zero. This is logically explained by the following equation:

ERROR/=MOS· MOS2/· C1· C2/· C4/

Likewise stages 82—84 must satisfy the following equation if the card was in synchronism with the format register:

ERROR/=MOS· (C2+C4)

where

MOS3=MOS1· MOS2

If either of the above two equations are false during the error flip-flop 108 triggering signal, the inverter 110 which is electrically connected between an OR gate 112 and the set input of ERROR flip-flop 108 will have a true output and the error flip-flop 108 will set.

Each succeeding punched card that is processed through the card reader will follow the format stored in the format registers 58 and 60. If a new format is desired, then a new format control card is read by the card reader and the format registers are changed.

In summary a format control system for card readers has been shown and described which allows rapid change of format information and provides a column synchronization check on each and every data information card. A multiple stage shift register or storage member containing an electrical signal representative of the desired format in a column-by-column manner provides a format control for each column of an information card.

What I claim is:

1. In a card reader, a format control system comprising:

a data information card, a format information card, reading means for columnar reading said data and format information cards, format information detecting means electrically connected to said reading means and responsive to said format card, strobing means operatively connected to said reading means for periodic interrogation of said reading means coincident with each column of said data and format information cards as said cards move relative to said reading means, an information storage register electrically and operatively connected to said reading means and said strobing means and responsive to said format information detecting means for receiving and storing format information from said format information card, and control means operatively coupling said reading means and said information storage register for controlling the processing of said data information card according to the format information in said information storage register.

2. In a card reader, a format control system according to claim 1 wherein said information storage register is a recirculating shift register.

3. In a card reader, a format control system according to claim 1 wherein said information storage register is an 84 stage recirculating shift register wherein four stages contain predetermined synchronization information for synchronizing the corresponding data and format information card column with a stage of said information storage register.

PO-1050
(5/69)

UNITED STATES PATENT OFFICE
CERTIFICATE OF CORRECTION

Patent No. 3,586,833 Dated June 22, 1971

Inventor(s) Robert H. Schafer

It is certified that error appears in the above-identified patent and that said Letters Patent are hereby corrected as shown below:

Abstract Section, line 6, should be --permits new format--.
Col. 3, line 71, should be --Row 1 and Row 2 - Ignore--.
Col. 4, line 28, should be --hereinafter--.
Col. 4, line 68, should be --STROBE + CTR4 • PLC--.
Col. 4, line 75, should be --TE/• CC Clock • LE--.
Col. 5, line 21, should be --=C2+C4+Row 1--.
Col. 5, line 22, should be --=C2+C4+Row 2--.
Col. 6, line 19, should be-MOS1/ • MOS2/--.
Col. 6, line 22, should be --MOS3 • (C2+C4)--.

Signed and sealed this 14th day of December 1971.

(SEAL)
Attest:

EDWARD M.FLETCHER,JR.
Attesting Officer

ROBERT GOTTSCHALK
Acting Commissioner of Patents